United States Patent [19]

Milunas et al.

[11] Patent Number: 4,779,490

[45] Date of Patent: Oct. 25, 1988

[54] OUTPUT SPEED SENSOR DIAGNOSTIC CONTROL FOR A MOTOR VEHICLE TRANSMISSION

[75] Inventors: Rimas S. Milunas, Royal Oak; Larry T. Nitz, Troy, both of Mich.

[73] Assignee: Saturn Corporation, Troy, Mich.

[21] Appl. No.: 101,939

[22] Filed: Sep. 28, 1987

[51] Int. Cl.$^4$ ............................................. B60K 41/06
[52] U.S. Cl. ...................................... 74/862; 74/864; 74/866; 364/424.1
[58] Field of Search ................. 74/862, 863, 864, 865, 74/866; 364/424.1

[56] References Cited

U.S. PATENT DOCUMENTS

| | | | |
|---|---|---|---|
| 4,363,973 | 12/1982 | Kawata et al. | 307/10 R |
| 4,495,457 | 1/1985 | Stahl | 364/424.1 |
| 4,523,281 | 6/1985 | Noda et al. | 74/866 X |
| 4,561,055 | 12/1985 | McKee | 74/866 X |
| 4,635,508 | 1/1987 | Tatsumi | 74/866 |
| 4,667,541 | 5/1987 | Shimaoka et al. | 74/866 |

*Primary Examiner*—Leslie A. Braun
*Assistant Examiner*—Dwight G. Diehl
*Attorney, Agent, or Firm*—Mark A. Navarre

[57] ABSTRACT

A transmission diagnostic control effective when there is an apparent loss of the transmission output speed signal for determining if failure is real, and if so, the cause of the failure. When an apparent loss of the output signal is observed, the transmission is successively upshifted through its various forward speed ratios while the transmission input speed is monitored to detect the occurrence of an upshift-related reduction thereof. If the shifting fails to produce a reduction in the transmission input speed by the time the transmission has been shifted to the highest available speed ratio, a total transmission failure is indicated. If the shifting produces a decrease in the transmission input speed, a total failure of the transmission is ruled out, and the diagnostic control determines if the failure is transmission or sensor related. If the output speed signal is still absent and the input speed is still high enough, after a shift-related reduction to generate vehicle motion, a speed sensor related failure is indicated. If the output speed signal indicates normal vehicle movement, the diagnostic control is terminated and all forward ratios lower than the current ratio are indicated as failed.

5 Claims, 10 Drawing Sheets

Fig. 4 — LOSS OF OIL PRESSURE STEADY THROTTLE

Fig. 5 — LOSS OF OIL PRESSURE WITH THROTTLE TIP-OUTS

OUTPUT SPEED SENSOR DIAGNOSTIC CONTROL FOR A MOTOR VEHICLE TRANSMISSION

This invention relates to motor vehicle transmission controls employing an output speed sensor for speed ratio selection, and more particularly to a diagnostic control for responding to a perceived failure of such sensor.

BACKGROUND OF THE INVENTION

Speed ratio selection in a motor vehicle automatic transmission is conventionally determined as a function of vehicle speed and engine throttle position or torque. When the ratio selection is electronically controlled, the vehicle speed information is derived from a sensor, such as an electromagnetic speed pickup, which generates an electrical speed signal corresponding to the output speed of the transmission.

A potential shortcoming of any such system is that a loss of the vehicle speed signal results in an immediate selection of the first or starting ratio and disables further ratio selection. This shortcoming has been recognized and various approaches have been suggested to minimize the likelihood of such an occurrence. Some systems include circuits for detecting an abrupt loss of the output speed signal; others employ multiple redundant sensors. See, for example, the U.S. Pat. Nos. 4,363,973, Kawata et al. and 4,523,281 Noda et al.

One problem in this regard is that loss of the output speed signal may not be detectable when the vehicle is in a normal idle condition. Indeed, at least one system employs a logical comparison of the output speed signal with various other signals when the vehicle is at rest for the purpose of detecting an inconsistency. See the Stahl U.S. Pat. No. 4,495,457.

However, speed sensor related failures are not the only reason for an apparent loss of the output speed signal. An apparent loss of the output speed signal can also occur when there is a transmission line or operating pressure failure, or merely a failure of the starting ratio of the transmission. In the case of a starting ratio failure, the transmission may be capable of continued operation in a higher ratio; disabling further operation of the transmission, in such case, may result in an unnecessary walk-home situation for the occupants of the vehicle.

SUMMARY OF THE PRESENT INVENTION

The present invention is directed to a diagnostic control effective when there is an apparent loss of the output speed signal for determining if failure is real, and if so, the cause of the failure. The transmission controller, according to this invention, monitors the input speed of the transmission in relation to a threshold speed indicative of normal vehicle movement or engine speed flare. If the threshold speed is exceeded for at least a predetermined time and no signal from the output speed sensor is observed, a failure is verified and the diagnostic control is initiated.

When the diagnostic control is initiated, the transmission controller is caused to successively upshift the transmission through its various forward speed ratios while monitoring the transmission input speed to detect the occurrence of an upshift-related reduction thereof. If the shifting fails to produce a reduction in the transmission input speed by the time the transmission has been shifted to the highest available speed ratio, a total transmission failure is indicated and a manual back-up mode is activated. If the shifting produces a decrease in the transmission input speed, a total failure of the transmission is ruled out and the diagnostic control determines if the failure is transmission or sensor related. If the output speed signal is still absent and the input speed is high enough to generate vehicle motion, a speed sensor related failure is indicated. If the output speed signal indicates normal vehicle movement, the diagnostic control is terminated and all forward ratios lower than the current ratio are indicated as failed. Further control functions are provided for avoiding an improper detection of a shift-related input speed reduction due to operator manipulation of the engine torque setting (throttle).

The diagnostic control method of this invention thus provides a reliable indication of both the existence of a failure and the cause of the failure. The information concerning the cause of the apparent output speed signal loss enables the transmission controller to take appropriate action and to avoid an unnecessary disabling of the transmission or degradation of its operation.

BRIEF DESCRIPTION OF THE DRAWINGS

FIGS. 6, 7a-7c, and 8a-8b depict flow diagrams representative of suitable program instructions executed by the computer based controller of FIG. 1 for carrying out the diagnostic routine of this invention. FIGS. 7a-7c depict the diagnostic routine of this invention; and FIGS. 8a-8b depict shift point selection and ratio failure routines.

DETAILED DESCRIPTION OF THE DRAWINGS

Figure 1A:
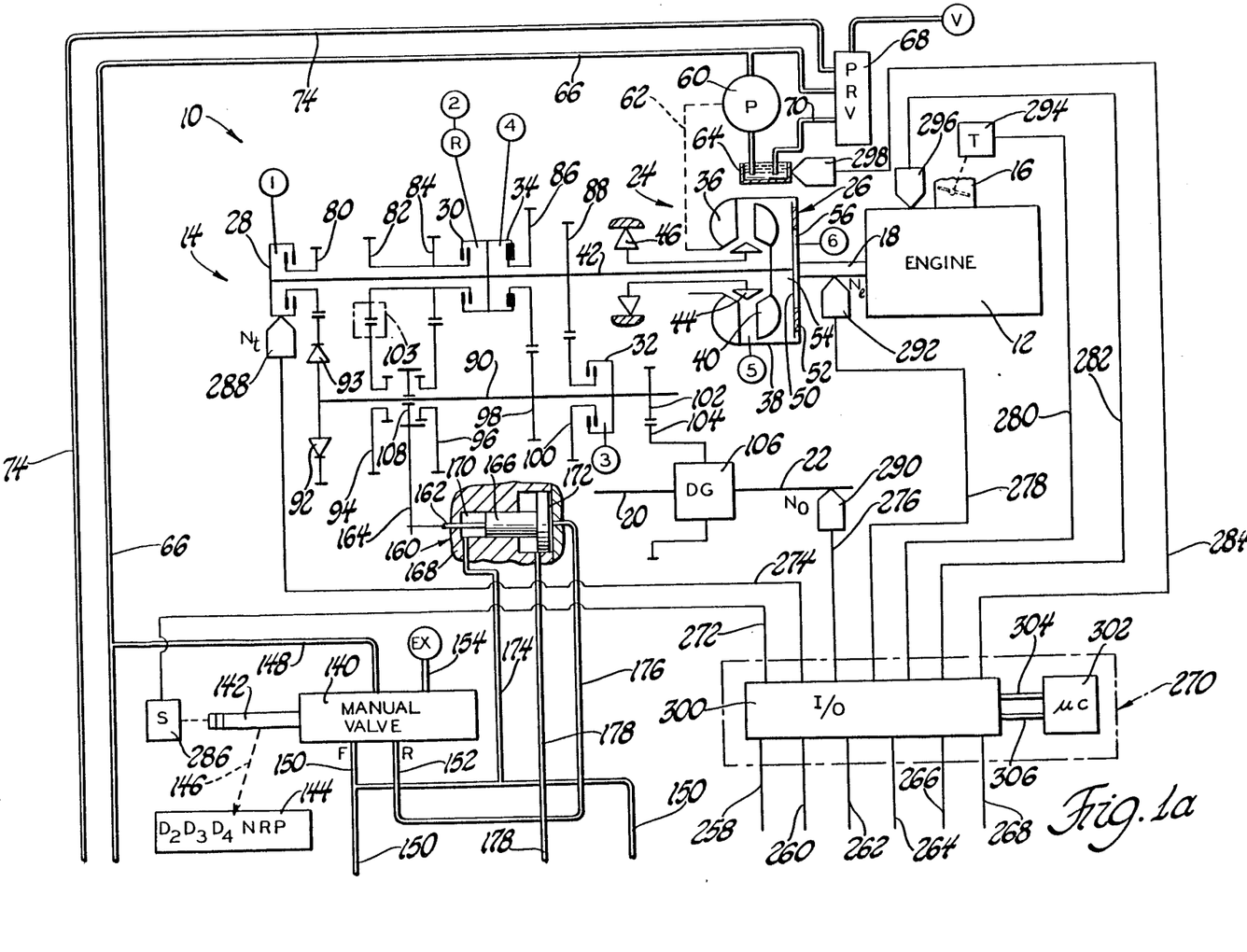
FIGS. 1a and 1b schematically depict a computer based electronic transmission control system according to the teachings of this invention.
Figure 1B:
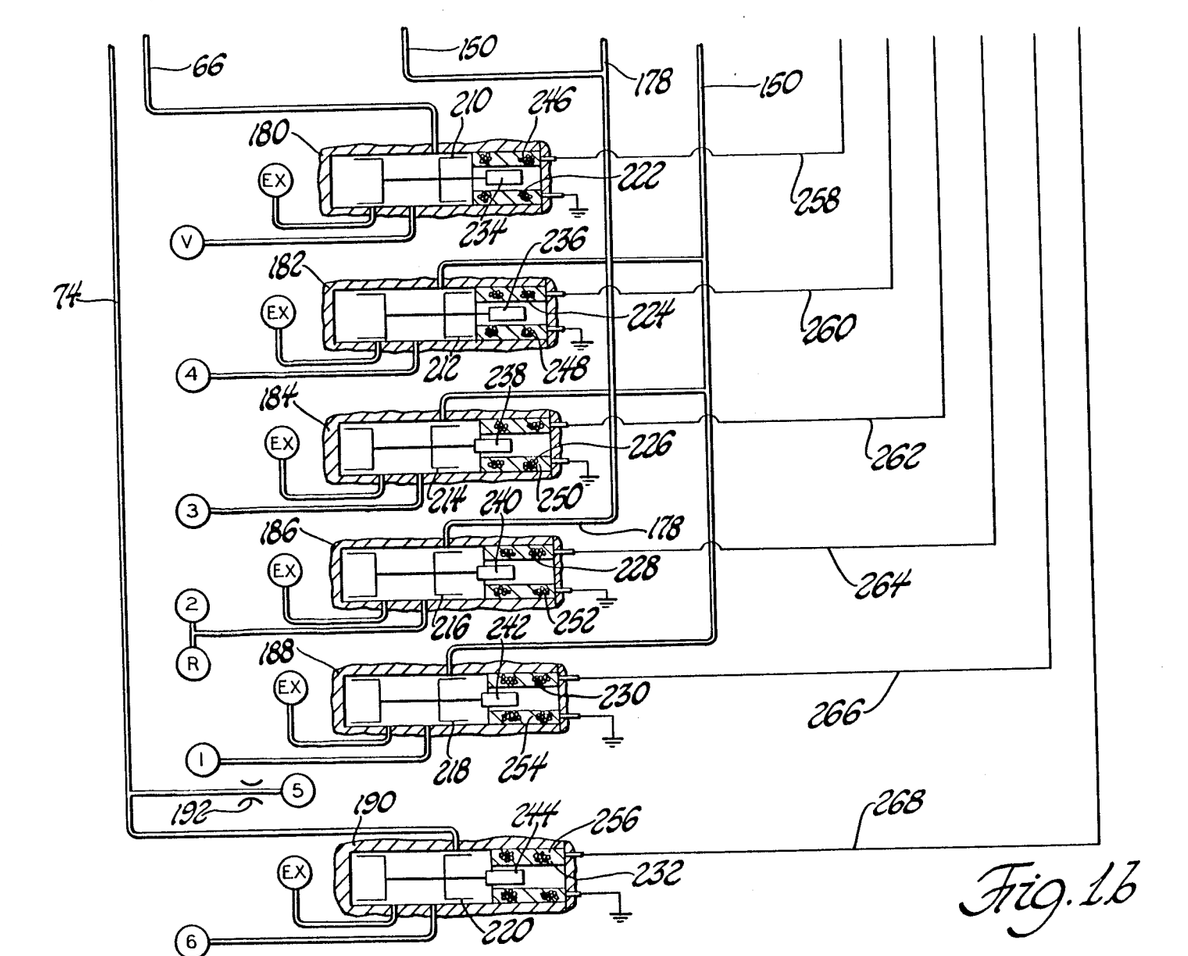

Referring now to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown), for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26-34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutching device 26 comprising a clutch plate 50 secured to the shaft 42.

The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545 to Schuster issued Aug. 3, 1982, and a representative pressure regulator valve is disclosed in the Vukovich U.S. Pat. No. 4,283,970 issued Aug. 18, 1981, such patents being assigned to the assignee of the present invention.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure.

The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

FIRST—2.368, SECOND—1.273 THIRD—0.808, FOURTH—0.585 [REVERSE]—1.880

Shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (Neutral) or P (Park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60, and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines.

Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool valves, other types of valves could be substituted therefor. By way of example, valves of the ball and seat type could be used. In general terms, the fluid valves 180–190 may be mechanized with any three-port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

Figure 6:
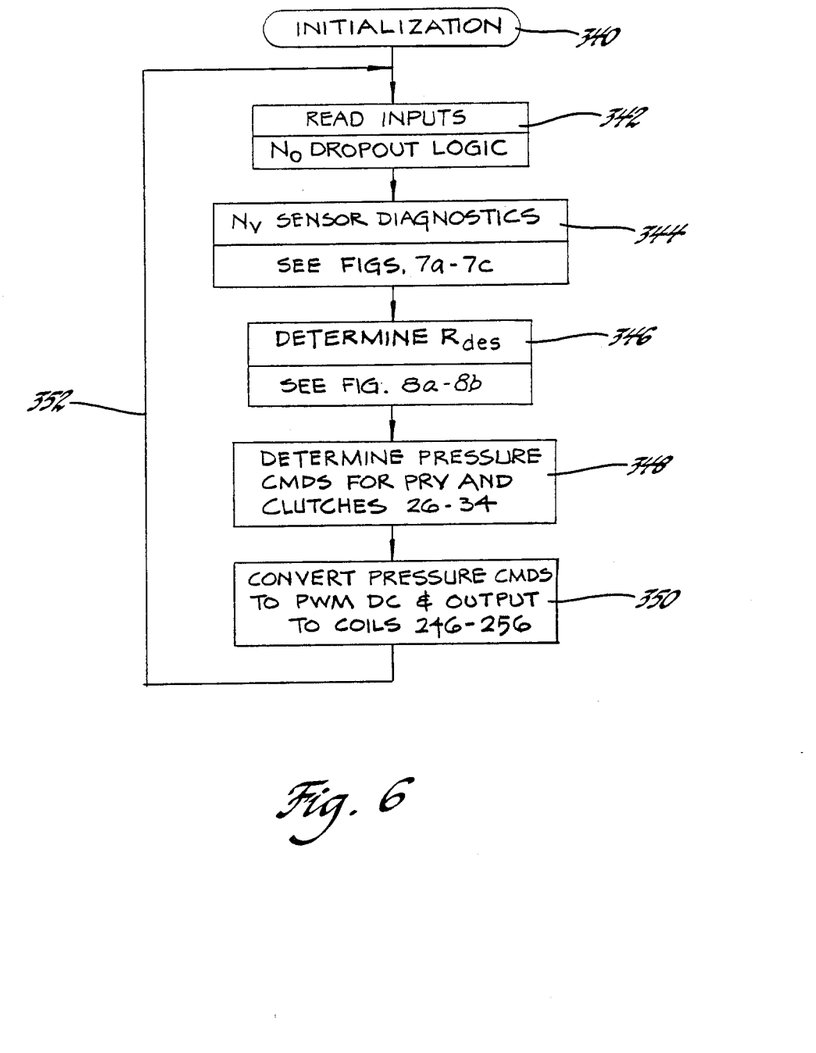
FIG. 6 depicts a main loop or executive program.
Figure 7A:
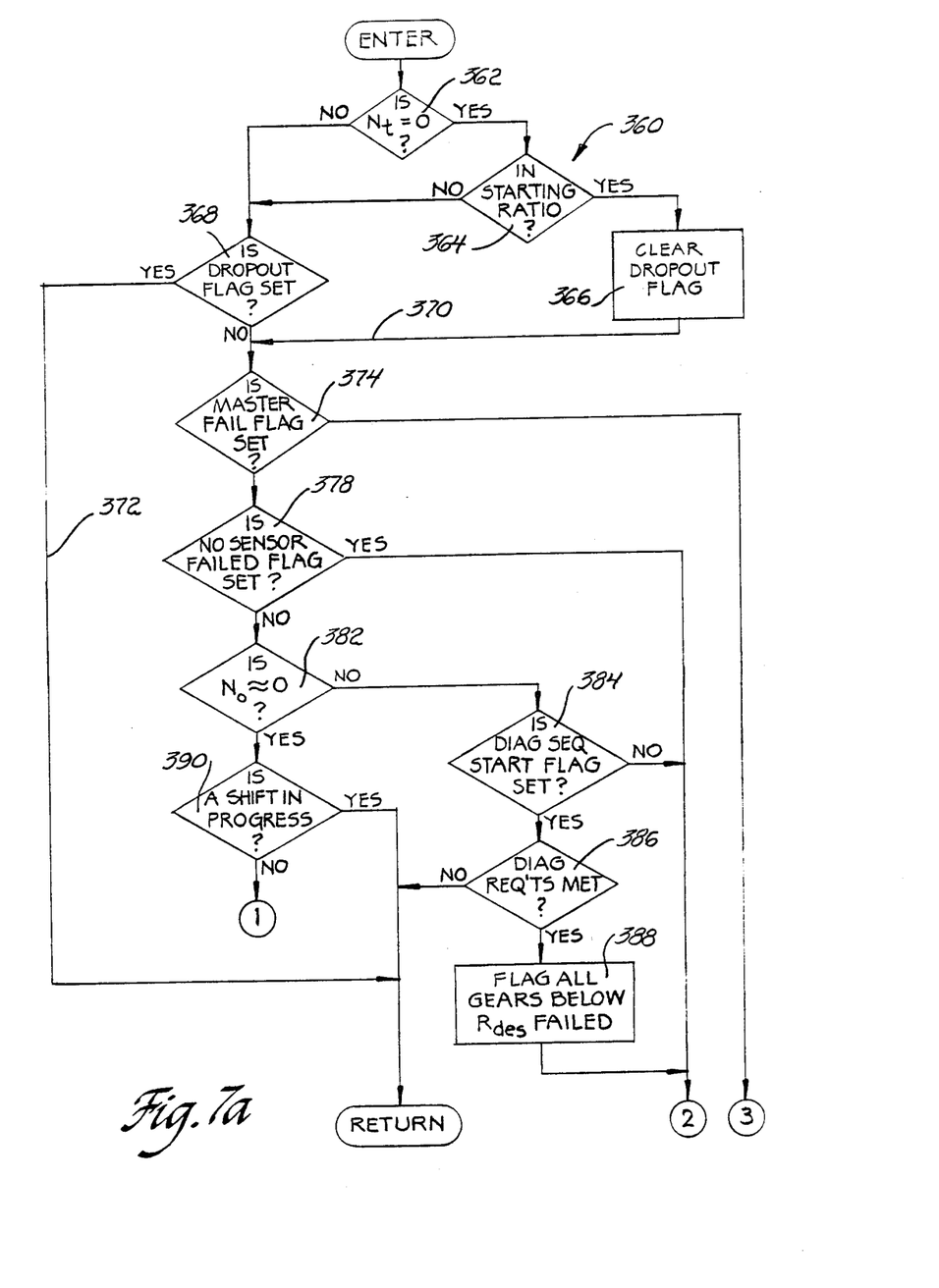
Figure 7B:
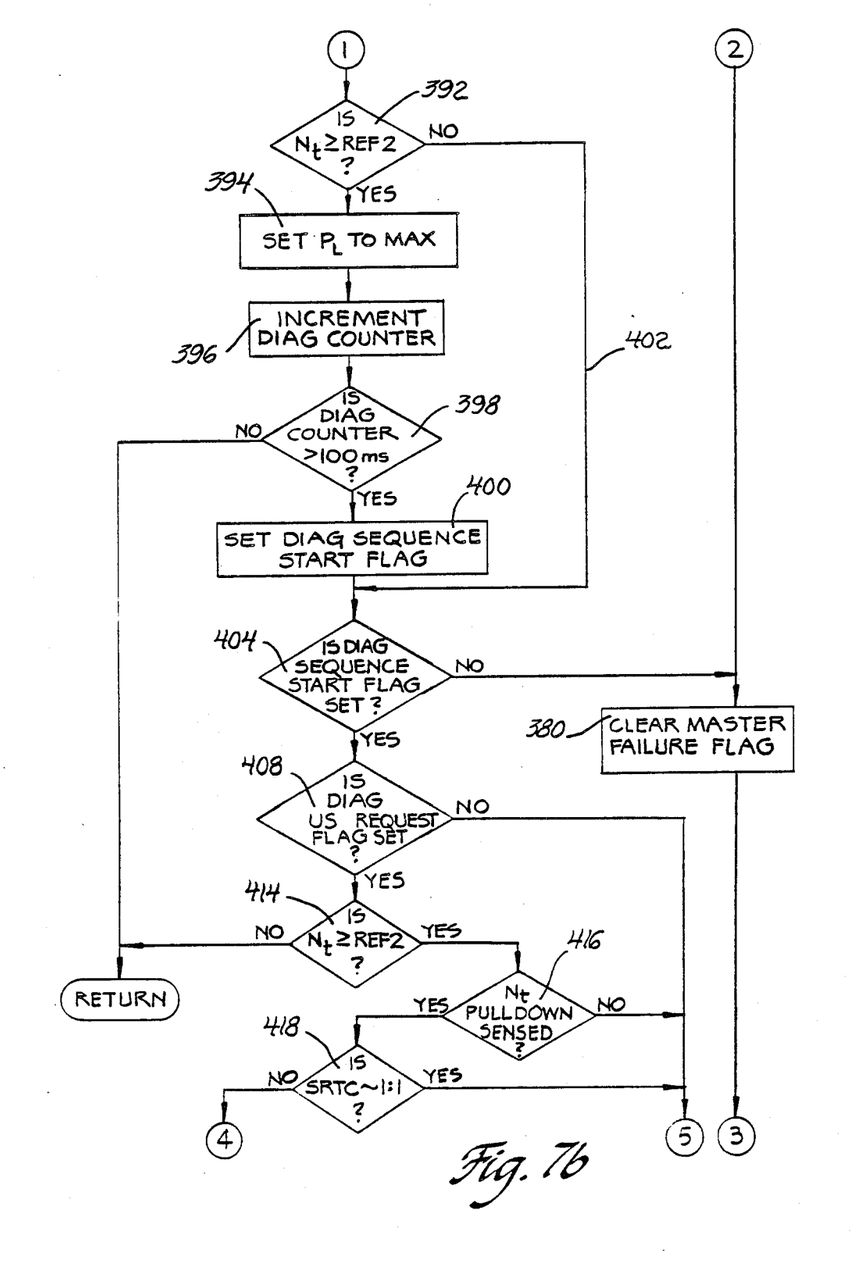
Figure 7C:
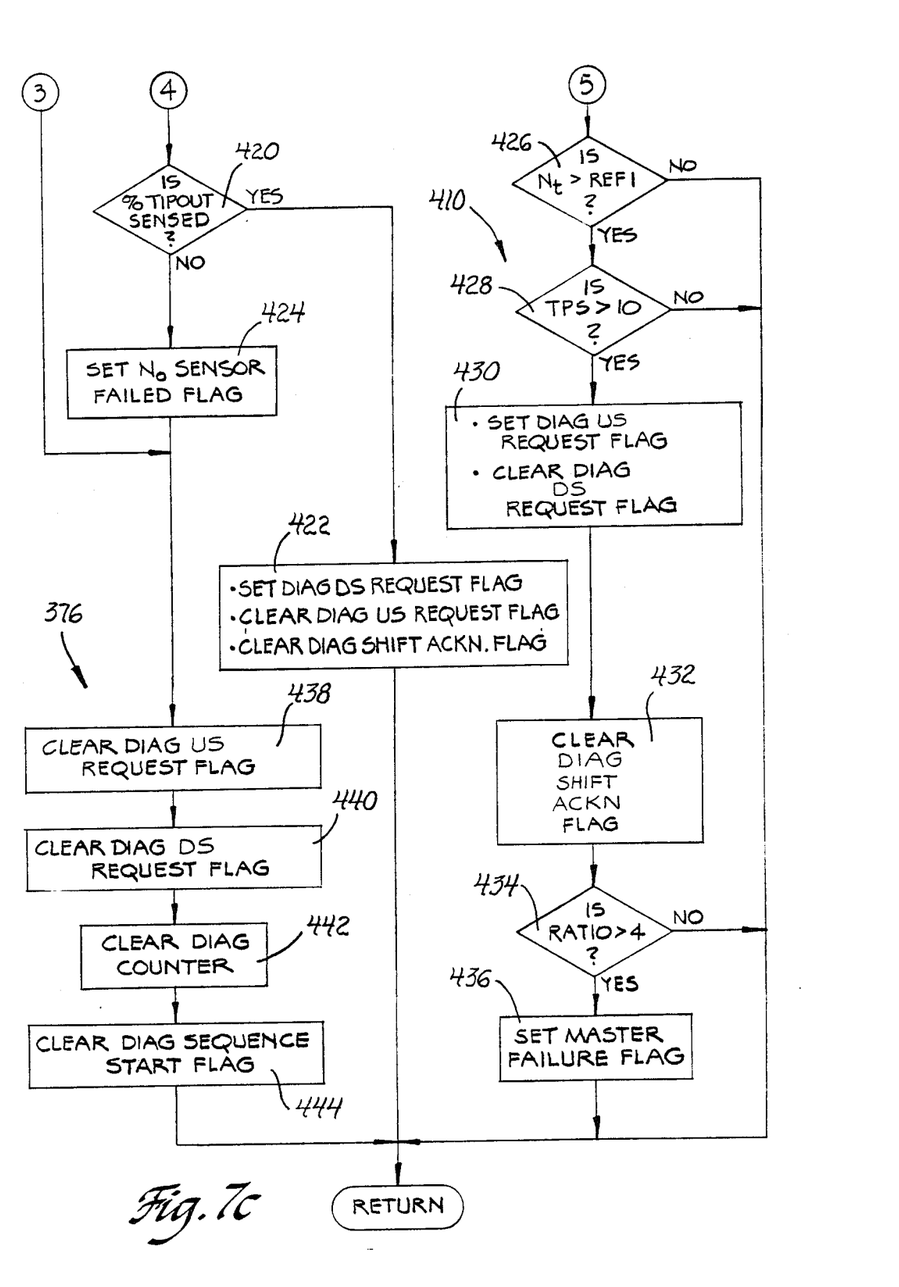
Figure 8A:
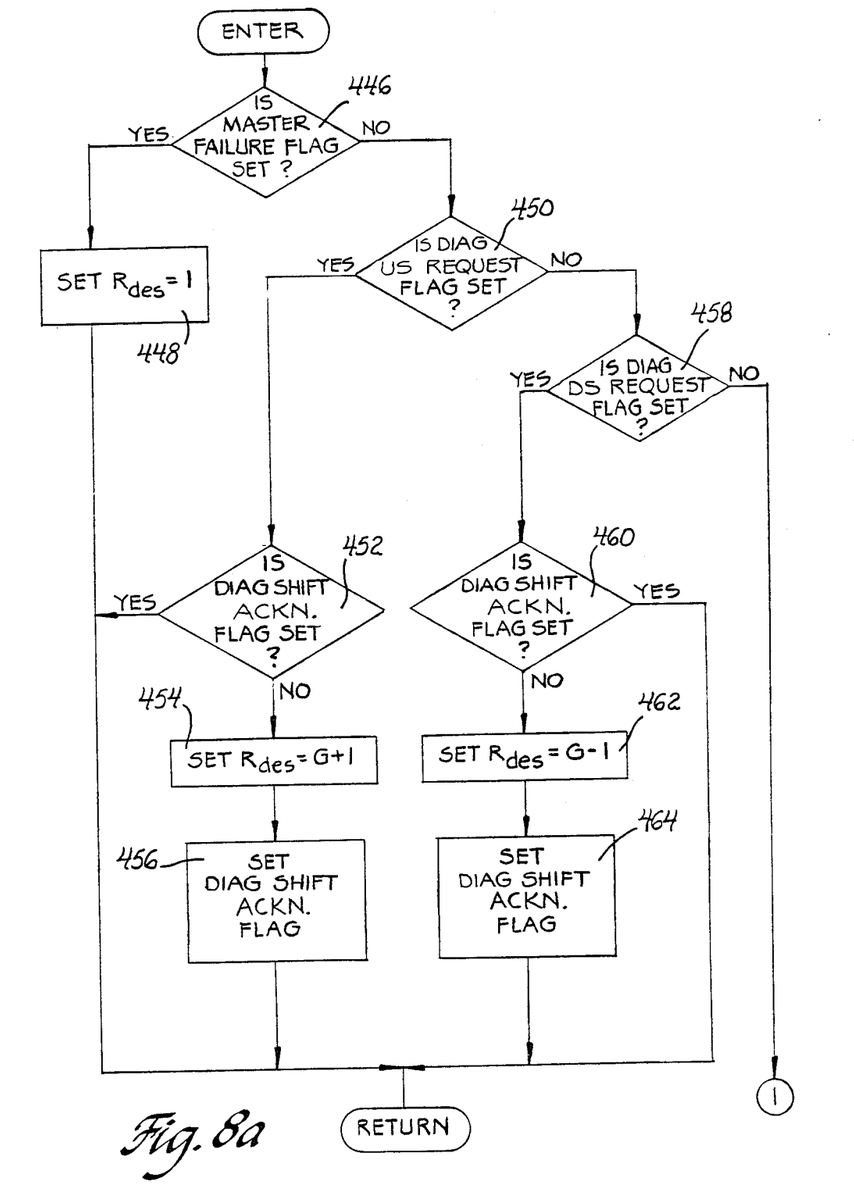

The control unit 270 responds to the input signals on input lines 272–284 according to a predetermined control algorithm as set forth herein, for controlling the energization of the fluid valve solenoid coils 246–256 via output lines 258–268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for carrying out the control functions of this invention and for developing such pulse-width-modulation outputs are depicted in FIGS. 6–8.

FIGS. 2–5 illustrate the operation of the diagnostic control of this invention under different vehicle operating conditions. For each case, the turbine speed $N_t$, the throttle position TPS, and the output speed $N_o$ are depicted on a common time base.

Figure 2:
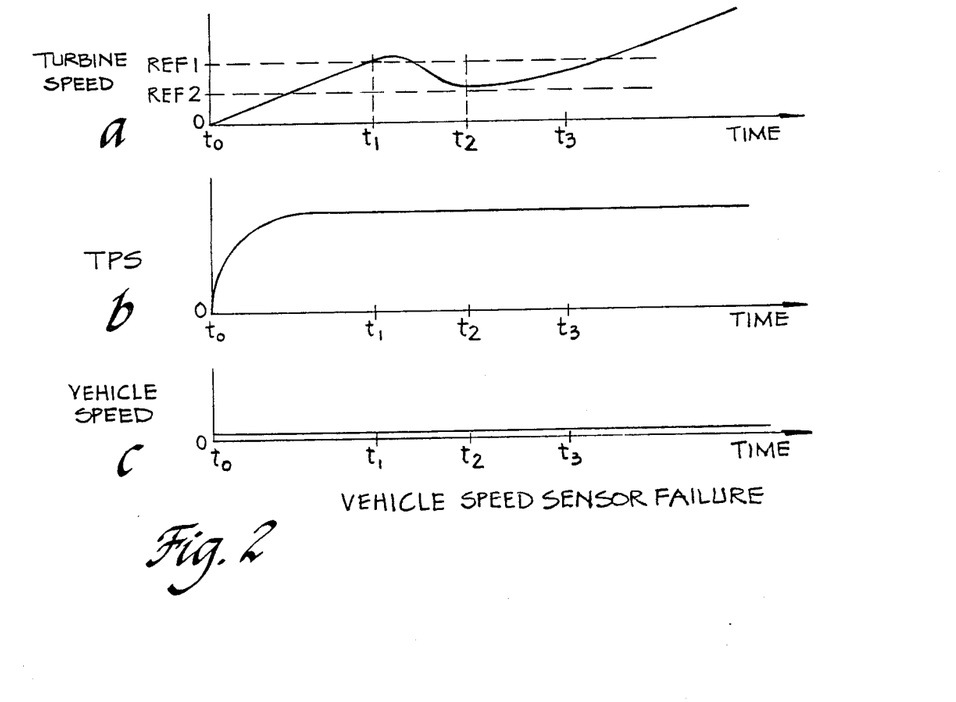
FIGS. 2-5 graphically depict the operation of the diagnostic control method of this invention for an output speed sensor related failure, a starting ratio failure, a steady throttle operating pressure failure, and an unsteady throttle operating pressure failure, respectively.

FIG. 2 represents the start up of a vehicle having an output speed sensor related failure. The failure may be due, for example, to a failed sensor, electrical connector, or wire. Although the output speed signal $N_o$ remains at zero, the vehicle responds to the throttle movement in a normal manner beginning at time $t_0$ and the turbine speed begins to increase. The control unit 270 monitors the turbine speed in relation to the reference speeds REF2 and REF1. When the turbine speed exceeds REF2 at time $t_1$, the control unit 270 increases the transmission line pressure to a maximum value MAX to prevent clutch slippage, if possible. The reference REF1 is indicative of either normal vehicle movement or NEUTRAL flaring (racing) of the engine 12, and is chosen such that turbine speed will still be in excess of REF2 following an upshift to the next ratio. Thus, when the turbine speed exceeds the reference REF1 at time $t_2$ (vehicle speed indication still zero), a failure is verified and the diagnostic control is initiated. After a predetermined delay, the diagnostic control initiates a 1-2 upshift, which causes a normal pull-down or reduction of the turbine speed $N_t$. The control unit 270 senses the pull-down at time $t_3$, and deduces the existence of an output speed sensor related failure.

Had the throttle position TPS been reduced in the course of the diagnostic control depicted in FIG. 2, a shift-related pull-down of the turbine speed could not be reliably sensed. To avoid an improper diagnosis under such conditions, the control unit 270 monitors the throttle position and the speed ratio SRTC across the torque converter 24. If a throttle tip-out (reduction) is detected in the course of a diagnostic upshift while the speed ratio SRTC is indicative of positive torque transmission, the transmission 14 is returned to the previously engaged ratio and the diagnostic control is reinitiated. This control is graphically illustrated for the vehicle operating condition depicted in FIG. 5.

Figure 5:
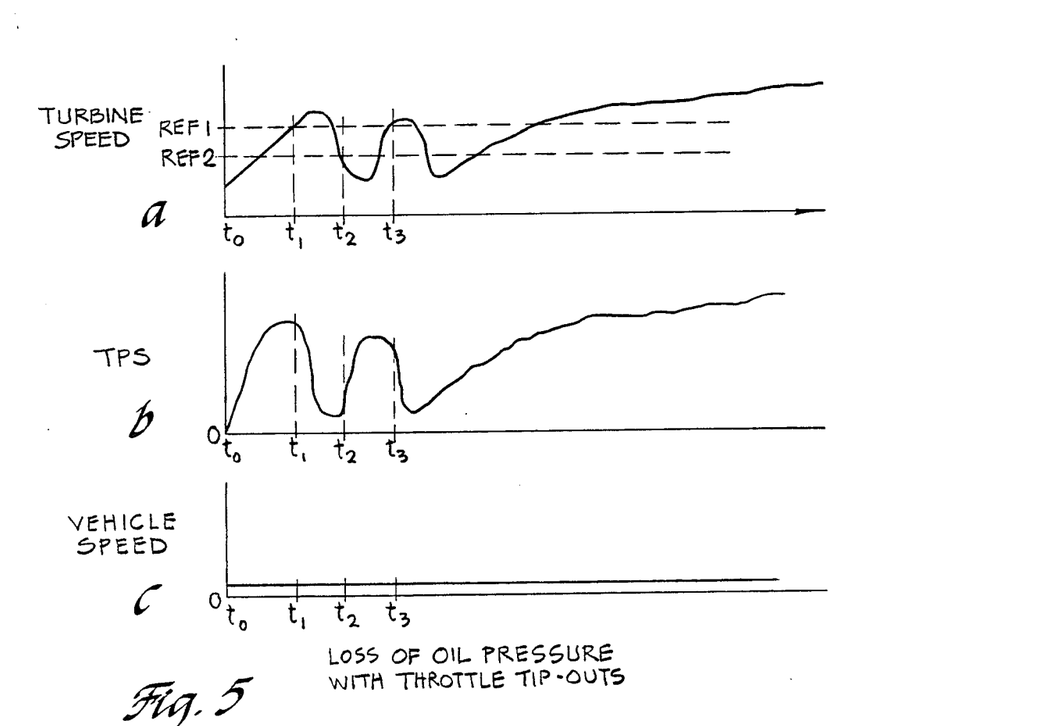

If the speed ratio SRTC indicates that no significant torque is being transmitted through torque converter 24, throttle tip-outs are irrelevant, and the diagnostic control is permitted to continue the upshift sequence to determine which, if any, of the forward speed ratios are available. This feature permits successful prompt completion of the diagnostic routine in situations where one or more of the lower forward ratios are not available, and the operator modulates the throttle position at each occurrence of engine flaring.

Figure 3:
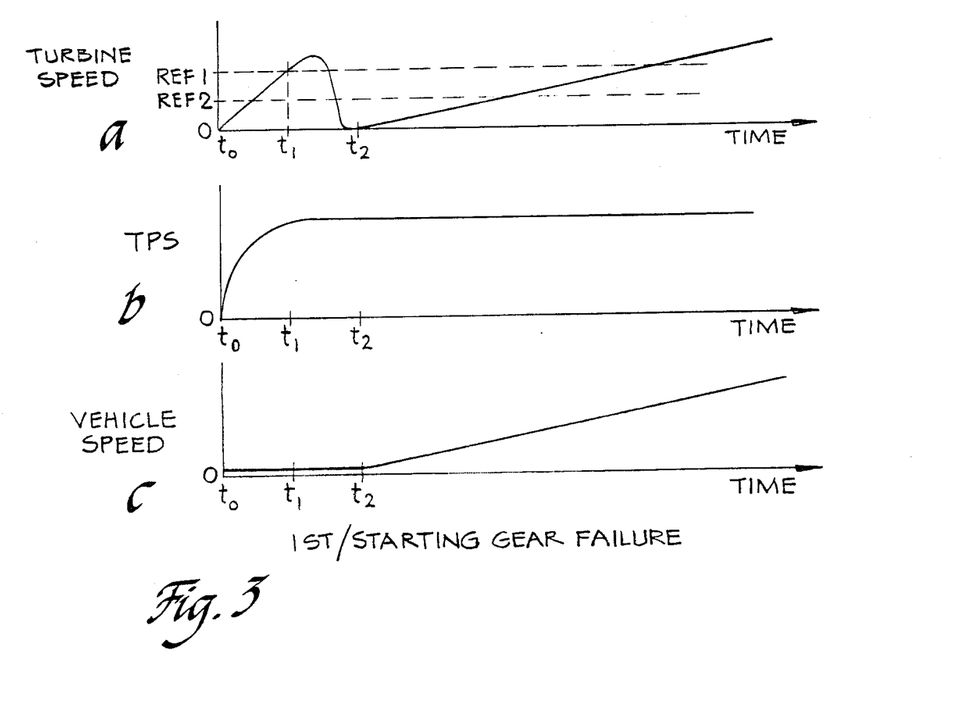

FIG. 3 represents the start up of a vehicle having a failed starting (FIRST) ratio. This failure may be due, for example, to a failed actuator or clutch. In this case, the engine 12 is unrestrained and the throttle movement starting at time $t_0$ causes the turbine speed $N_t$ to flare. However, the vehicle is stationary and the output speed signal remains at zero. When the turbine speed $N_t$ rises above the reference speed REF2, the line pressure is set to the maximum value MAX, as indicated above. Shortly after time $t_1$ when the turbine speed rises above the reference REF1, the control unit 270 initiates a diagnostic 1-2 upshift. This brings the turbine speed substantially to zero and causes an increase in the output speed signal as oncoming clutch for SECOND ratio begins engaging and the vehicle begins to move. The control unit 270 senses a nonzero output speed signal with the turbine speed less than REF2, and flags all forward ratios lower than the engaged ratio—FIRST, in the present example—as failed.

Figure 4:
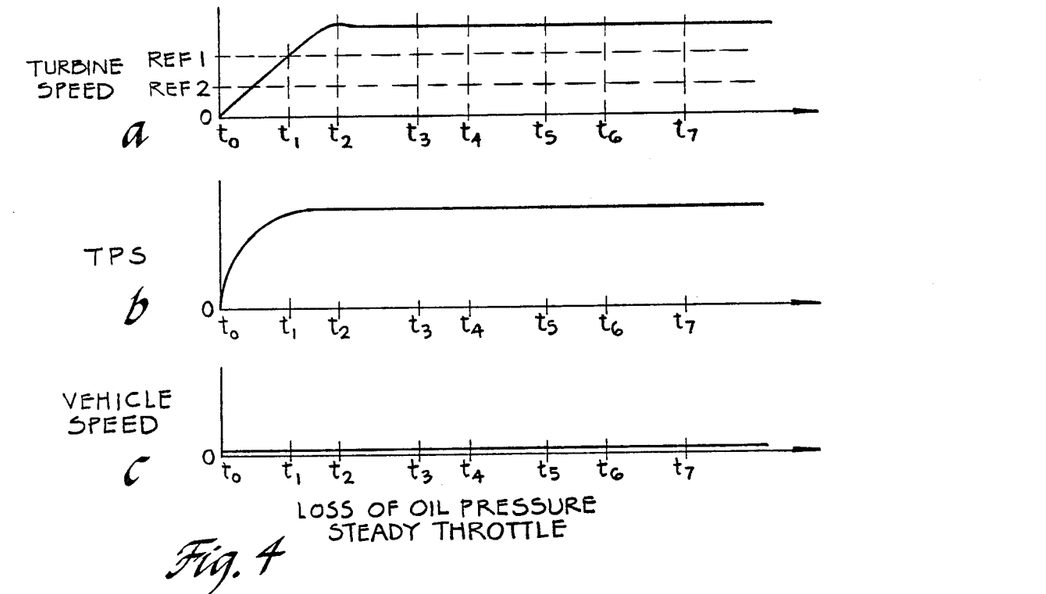

FIGS. 4 and 5 represent the start up of a vehicle having a loss of the transmission operating pressure. This failure may be due, for example, to a failed servo valve, actuator, or pump. As in the example illustrated in FIG. 3, the engine 12 is unrestrained and the throttle movement starting at time $t_0$ causes the turbine speed to flare. Meanwhile, the vehicle remains stationary and the output speed signal $N_o$ remains at zero.

In the example of FIG. 4, the throttle position is maintained steady, and shortly after time $t_1$ when the turbine speed $N_t$ rises above the reference speed REF1, the control unit 270 initiates a diagnostic 1-2 upshift. Due to the pressure loss, the shift does not occur and there is no turbine speed pull-down. At such point, the control unit 270 initiates a diagnostic 2-3 upshift. This shift also fails to occur and the control unit 270 sequentially upshifts the transmission in the above manner until the highest ratio (FOURTH) is commanded. Since no ratio can be engaged, the control unit 270 deduces at least partial loss of operating pressure and enters a back-up hydraulic mode in which hydraulic valving directs whatever fluid pressure is available to a default clutch.

In the example of FIG. 5, a throttle position tip-out occurs shortly after the diagnostic upshift command. Since the speed ratio SRTC indicates that no significant torque is being transmitted through the torque converter 24, the diagnostic upshifting is permitted to continue despite the throttle tip-outs. When the highest or FOURTH ratio has been commanded, and no turbine speed pull-down observed, the loss of transmission operating pressure is indicated and the hydraulic back-up mode is activated.

The flow diagrams depicted in FIGS. 6–8 represent program instructions to be executed by the microcomputer 302 of control unit 270 in mechanizing the diagnostic control of this invention. The flow diagram of FIG. 6 represents a main or executiee program which calls various subroutines for executing particular control functions as necessary. The flow diagrams of FIGS. 7a–7c and 8a–8b represent subroutine functions pertinent to the present invention.

Referring now more particularly to FIG. 6, the reference numeral 340 designates a set of program instructions executed at the initiation of each period of vehicle operation for initializing the various registers, timers, etc. used in carrying out the control functions of this invention. Following such initialization, the instruction blocks 342–350 are repeatedly executed in sequence as designated by the flow diagram lines connecting such instruction blocks and the return line 352.

Instruction block 342 serves to read the various input signals applied to I/0 device 300 via the lines 272–284, to update (increment) the various control unit timers, and to perform output speed drop-out logic. The output speed drop-out logic functions to detect a sudden loss of the output speed signal $N_o$ and to set a DROP-OUT flag whenever a sudden loss is detected. A sudden drop-out can occur in normal operation (as in hard braking on a slippery road surface), and a set DROP-OUT flag indicates merely a potential output speed sensor related failure. Until the vehicle is brought to a stop, the diagnostic routine is disabled, and further shifting is carried out in accordance with an estimation of the output speed $N_o$, based on the turbine speed $N_t$ and ratio R. Once the vehicle has been brought to a stop, execution of the diagnostic routine is enabled to determine if an output speed sensor related failure has in fact occurred.

Instruction block 344 performs the diagnostic control of this invention and is set forth in greater detail in the flow diagrams of FIGS. 7a–7c as indicated at block 344. Instruction block 346 determines the desired speed ratio, $R_{des}$, and is set forth in greater detail in the flow diagram of FIGS. 8a–8b as indicated at block 346.

Instruction block 348 serves to determine pressure commands for both the pressure regulator valve PRV and the clutching devices 26–34 for shifting and non-shifting modes of operation, based primarily on the transmission input torque and the desired speed ratio. Instruction block 350 converts the clutching device and PRV pressure commands to a PWM duty cycle based on the operating characteristics of the various actuators (empirically determined) and energizes the actuator coils 246–256 accordingly.

Referring now to the flow diagrams of FIGS. 7a–7c, the blocks generally designated by the reference numeral 360 are first executed to determine if execution of the diagnostic routine is appropriate. The decision blocks 362–364 determine if the vehicle has been brought to a stop and the starting or FIRST ratio engaged. If so, the instruction block 366 is executed to clear the DROP-OUT flag (if set) and execution of the diagnostic routine is permitted. If either of the decision blocks 362–364 are answered in the negative, the execution of instruction block 366 is skipped and the decision block 368 is executed to determine if the DROP-OUT flag is set. If the DROP-OUT flag is not set, the diagnostic routine is permitted to be executed as indicated by the flow diagram line 370; if the DROP-OUT flag is set, execution of the diagnostic routine is skipped, as indicated by the flow diagram line 372.

In performing the diagnostic routine, the decision block 374 is first executed to determine if the MASTER FAIL flag is set, indicating that there has been a loss of the transmission operating pressure. If so, further execution of the diagnostic routine is not required and the flow diagram portion 376 of FIG. 7c is executed to clear the various diagnostic shift control flags and counters, as indicated by the circled numeral 3.

The decision block 378 determines if the OUTPUT SPEED SENSOR FAILED flag is set. As indicated below, this flag is set by the control unit 270 to indicate an output speed sensor related failure in the presence of a vehicle operating condition, such as depicted by the graphs of FIG. 2. If the flag is set, further execution of the diagnostic routine is not required; the instruction block 380 of FIG. 7b is executed to clear the MASTER FAILURE flag and the flow diagram portion 376 of FIG. 7c is executed as indicated above to clear the various diagnostic shift control flags and counters.

If the OUTPUT SPEED SENSOR FAILED flag is not set, the decision block 382 is executed to determine if the output speed signal $N_o$ is at or near zero. If not, vehicle movement is indicated and the blocks 384–388 are executed to determine which, if any, forward ratios have failed. If the DIAGNOSTIC SEQUENCE START flag is set and the diagnostic requirements (turbine speed pull-down, no throttle tip-out, etc.) have been met, the instruction block 388 is executed to flag all forward ratios lower than the currently engaged ratio $R_{des}$ as failed. Thereafter, the instruction block 380 and the flow diagram portion 376 are executed to complete the diagnostic routine. If the diagnostic requirements are not met, the remainder of the routine is skipped. If the DIAGNOSTIC SEQUENCE START flag is not set, diagnostic shifting has not occurred; this represents a normal mode of operation and the instruction block 380 and the flow diagram portion 376 are executed to complete the diagnostic routine.

If the output speed signal $N_o$ is substantially zero, there may be a system failure and the decision block 390 is executed to determine if a transmission ratio shift is in progress. If so, the remainder of the diagnostic routine is skipped. If not, the decision block 392 of FIG. 7b is executed to determine if the turbine speed $N_t$ is greater than or equal to the reference speed REF2. If the turbine speed $N_t$ exceeds the reference REF2, the blocks 394–400 are executed to set the transmission line pressure $P_L$ to a maximum value MAX and to time a predetermined interval using a register referred to as the DIAGNOSTIC COUNTER. So long as the turbine speed $N_t$ exceeds the reference REF2, the DIAGNOSTIC COUNTER is incremented by the instruction block 396. When the count in the DIAGNOSTIC COUNTER exceeds a count indicative of a predetermined interval, such as 100 milliseconds (as determined at decision block 398), the instruction block 400 is executed to set the DIAGNOSTIC SEQUENCE START flag. If the turbine speed $N_t$ subsequently falls below the reference speed REF2 the execution of blocks 394–400 is skipped, as indicated by the flow diagram line 402.

The instruction block 404 is then executed to determine if the DIAGNOSTIC SEQUENCE START flag has been set. If the DIAGNOSTIC SEQUENCE START flag is not set, the instruction block 380 and the flow diagram portion 376 of FIG. 7c are executed as described above to clear the various diagnostic shift flags and exit the diagnostic routine.

If the DIAGNOSTIC SEQUENCE START flag is set, the flow diagram portion comprising the blocks 408-425 is executed to determine if a diagnostic shift request is appropriate. The decision block 408 is first executed to determine if the DIAGNOSTIC UPSHIFT REQUEST flag is set. If not, the flow diagram portion 410 of FIG. 7c is executed to initiate a diagnostic upshift as indicated by the circled numeral 5.

If the DIAGNOSTIC UPSHIFT REQUEST flag is set, the blocks 414-420 are executed to analyze the shift. The decision block 414 first determines if the turbine speed $N_t$ is greater than or equal to the reference speed REF2 defined in reference to FIGS. 2-5. If the turbine speed $N_t$ is less than the reference REF2, the remainder of the routine is skipped. If the turbine speed $N_t$ is greater than or equal to the reference REF2, the decision block 416 is executed to determine if there has been a shift related pull-down of the turbine speed $N_t$. If no pull-down is detected, a failure of the current speed ratio is deduced and the flow diagram portion 410 of FIG. 7c is executed as indicated above to initiate a further diagnostic upshift.

If a pull-down of the turbine speed $N_t$ is sensed, the decision block 418 is executed to determine if the speed ratio SRTC across the torque converter 24 is substantially 1:1—that is, that no significant torque is being transmitted through the torque converter 24. If so, a failure of the current ratio is presumed; in such event, the remainder of the routine is skipped and the flow diagram portion 410 of FIG. 7c is executed, as indicated above, to initiate a further diagnostic upshift. If the speed ratio SRTC indicates the transmission of significant torque through torque converter 24, the decision block 420 of FIG. 7c is executed to determine if an engine throttle tip-out or reduction has been detected. If a throttle tip-out has occurred, the turbine speed pull-down is not a reliable indication of a successful shift and the instruction block 422 is executed to set the DIAGNOSTIC DOWNSHIFT REQUEST flag and to clear the DIAGNOSTIC SHIFT ACKNOWLEDGED and the DIAGNOSTIC UPSHIFT REQUEST flags. This commands the transmission to return to the previously engaged speed ratio, as indicated above in reference to FIG. 5, for reinitiating the diagnostic shift sequence.

If decision block 420 indicates that no throttle tip-out has been detected, there is an output speed sensor related failure and the instruction block 424 is executed to set the OUTPUT SPEED SENSOR FAILED flag. Thereafter the flow diagram portion 376 is executed to exit the diagnostic routine.

Referring now to the flow diagram portion 410 of FIG. 7c, the decision blocks 426-428 are first executed to determine if the turbine speed $N_t$ is greater than the reference speed REF1 and the throttle position is greater than a specified setting such as 10%. If either condition is not met, the remainder of the routine is skipped and a diagnostic upshift is not scheduled. If both conditions are met, the instruction blocks 430 and 432 are executed to set the DIAGNOSTIC UPSHIFT REQUEST flag and to clear the DIAGNOSTIC SHIFT ACKNOWLEDGED and the DIAGNOSTIC DOWNSHIFT REQUEST flags. Thereafter the decision block 434 is executed to determine if the commanded ratio is greater than the highest or FOURTH ratio. If so, the upshift sequence effected by the diagnostic control is complete and the instruction block 436 is executed to set the MASTER FAILURE flag. This indicates that there has been a loss of the transmission operating pressure since no ratio is available.

Referring now to the flow diagram portion 376 of FIG. 7c the instruction blocks 438-444 are executed in sequence to clear the various diagnostic control terms. The instruction block 438 clears the DIAGNOSTIC UPSHIFT REQUEST flag; the instruction block 440 clears the DIAGNOSTIC DOWNSHIFT REQUEST flag; the instruction block 442 clears the DIAGNOSTIC COUNTER; and the instruction block 444 clears the DIAGNOSTIC SEQUENCE START flag.

Referring now to the desired ratio determination flow diagram of FIGS. 8a-8b, the decision block 446 is first executed to determine if the MASTER FAILURE flag has been set. If so, the hydraulic back up of transmission 14 is in effect and the instruction block 448 is executed to set the desired ratio $R_{des}$ to FIRST. If the MASTER FAILURE flag is not set the decision block 450 is executed to determine if the DIAGNOSTIC UPSHIFT REQUEST flag is set. If the DIAGNOSTIC UPSHIFT REQUEST flag is set, the decision block 452 is executed to determine if the DIAGNOSTIC SHIFT ACKNOWLEDGED flag is set. If so, the remainder of the routine is skipped. If not, the instruction blocks 454-456 are executed to set the desired ratio $R_{des}$ to one ratio higher than the present ratio G, and to set the DIAGNOSTIC SHIFT ACKNOWLEDGED flag, completing the routine.

If the DIAGNOSTIC DOWNSHIFT REQUEST flag is set, as determined at decision block 458, the decision block 460 is executed to determine if the DIAGNOSTIC SHIFT ACKNOWLEDGED flag is set. If so, the remainder of the routine is skipped. If not, the instruction blocks 462-464 are executed to set the desired ratio $R_{des}$ to one ratio lower than the present ratio G and to set the DIAGNOSTIC SHIFT ACKNOWLEDGED flag, completing the routine.

If neither of the diagnostic shift request flags are set, the decision block 466 of FIG. 8b is executed to determine if the DIAGNOSTIC SEQUENCE START flag is set. If not, and the engine is running (as determined at decision block 468), the decision block 470 is executed to determine if a ratio failure has been indicated. If so, the instruction block 472 is executed to adjust the shift pattern look-up table to reflect the loss of the desired ratio.

The blocks 473-478 are then executed to look up the desired speed ratio $R_{des}$ from the normal shift pattern table as a function of output speed $N_o$ and the throttle position % T. If the DROP-OUT or $N_o$ SENSOR FAILED flags are set, a failure of the output speed sensor is indicated, and the output speed $N_o$ is estimated according to the product of the turbine speed $N_t$ and the currently engaged ratio $R_{des}$.

In the above manner, the diagnostic control of this invention provides an improved approach to identifying the source of a detected failure. It thereby enables the controller to take an appropriate corrective action and avoids an unnecessary disabling of the transmission or degradation of its operation.

While described in reference to the illustrated embodiment, it will be understood that various modifications to the control illustrated herein will occur to those skilled in the art, and that diagnostic controls incorporating such modifications may fall within the scope of this invention, which is defined by the appended claims.

The embodiments of the invention in which an exclusive property or privilege is claimed are defined as follows:

1. In a motor vehicle including an engine drivingly connected to an input shaft of a power transmission controllable to selectively establish one of a plurality of speed ratios between said input shaft and an output shaft thereof, where shifting among such speed ratios is scheduled in accordance with an output speed signal generated by a transmission output shaft speed sensor, a method of operation for diagnosing an apparent loss of the output speed signal, comprising the steps of:

detecting the occurrence of an apparent failure condition in which the output speed signal indicates that the vehicle is at rest, but the transmission input shaft speed is substantially in excess of an idle speed of the engine; and in response to such detection;

initiating upshifting of the transmission to successively higher speed ratios while monitoring the speed of the transmission input shaft to detect the occurrence of an upshift-related reduction thereof; and indicating the occurrence of (1) a total transmission speed ratio failure if no shift-related reduction of the transmission input shaft speed is detected by the time the transmission is upshifted to the highest available speed ratio, (2) a partial transmission speed ratio failure in response to the detection of a shift-related reduction of the transmission input shaft speed, if an output speed signal indicative of vehicle movement is observed, and (3) a speed sensor related failure in response to the detection of a shift-related reduction of the transmission input shaft speed, if the output speed signal indicates that the vehicle is at rest and the input shaft speed is sufficiently great to produce vehicle movement.

2. The method set forth in claim 1, including the steps of:

monitoring the output speed signal while the vehicle is in motion to detect the occurrence of an unexpected loss of the same; and in response to such detection, scheduling transmission speed ratio shifting in accordance with an estimation of the transmission output shaft speed, and inhibiting the detection of said apparent failure condition until the vehicle is at rest.

3. The method set forth in claim 1, including the steps of:

monitoring an operator manipulated torque setting of said engine during said transmission upshifting to detect a return of such setting substantially to an idle setting; and in response to such detection, downshifting to a previously established transmission speed ratio, and thereafter reinitiating said transmission upshifting, thereby to avoid the improper detection of an upshift-related reduction of the transmission input shaft speed.

4. The method set forth in claim 3, wherein said motor vehicle includes a fluid coupled torque transmitting device coupling the engine to the transmission, and the method includes the steps of:

measuring the speed ratio across the fluid coupled torque transmitting device as an indication of the torque transmitted therethrough; and inhibiting said monitoring of the operator manipulated engine torque setting when said measured speed ratio indicates that substantially no torque is being transmitted through said torque transmitting device.

5. The method set forth in claim 1, wherein the step of indicating the occurrence of a partial transmission speed ratio failure includes the step of:

indicating as failed all transmission speed ratios lower than the speed ratio established at the time that the shift-related reduction of the transmission input shaft speed is detected.

* * * * *